(12) United States Patent
Huang et al.

(10) Patent No.: US 9,773,174 B2
(45) Date of Patent: Sep. 26, 2017

(54) VEHICLE DETECTION METHOD BASED ON THERMAL IMAGING

(71) Applicant: NATIONAL CHUNG SHAN INSTITUTE OF SCIENCE AND TECHNOLOGY, Taoyuan (TW)

(72) Inventors: Shih-Shinh Huang, Kaohsiung (TW); Shih-Che Chien, Hsinchu (TW); Feng-Chia Chang, Kaohsiung (TW)

(73) Assignee: NATIONAL CHUNG SHAN INSTITUTE OF SCIENCE AND TECHNOLOGY (TW)

(*) Notice: Subject to any disclaimer, the term of this patent is extended or adjusted under 35 U.S.C. 154(b) by 134 days.

(21) Appl. No.: 14/969,217

(22) Filed: Dec. 15, 2015

(65) Prior Publication Data

US 2017/0169299 A1    Jun. 15, 2017

(51) Int. Cl.
*G06K 9/00* (2006.01)
*G06T 7/00* (2017.01)
*G06K 9/62* (2006.01)

(52) U.S. Cl.
CPC ..... *G06K 9/00785* (2013.01); *G06K 9/00825* (2013.01); *G06K 9/6215* (2013.01);
(Continued)

(58) Field of Classification Search
CPC ...... B60R 2300/106; B60R 2300/8093; G06K 9/00791; G06K 9/00805; G06K 9/00664;
(Continued)

(56) References Cited

U.S. PATENT DOCUMENTS 5,644,386 A * 7/1997 Jenkins ................ G01S 17/023
                                                  244/3.16
2013/0162834 A1 * 6/2013 Wang ..................... G06T 5/009
                                                  348/164

(Continued)

OTHER PUBLICATIONS

Iwasaki, Yoichiro, Masato Misumi, and Toshiyuki Nakamiya. "Robust vehicle detection under various environmental conditions using an infrared thermal camera and its application to road traffic flow monitoring." Sensors 13, No. 6 (2013): 7756-7773.*

*Primary Examiner* — Sumati Lefkowitz
*Assistant Examiner* — Carol Wang
(74) *Attorney, Agent, or Firm* — Schmeiser, Olsen & Watts, LLP

(57) ABSTRACT

A vehicle detection method includes (1) vehicle likelihood region identifying step; (2) vehicle component locating step; and (3) vehicle detecting step. To reduce complexity of calculation and enhance accuracy of detection, the method uses a vehicle likelihood region identifying algorithm to eliminate background regions from a total thermal image and keep vehicle likelihood regions therein for use in further analysis and processing, detects obvious vehicle components, such as vehicle windows and vehicle bottoms, in the thermal image to thereby identify vehicle component likelihood regions, describes a space geometric relationship of vehicle components with a Markov random field model, defines vehicle detection as problems with maximum a posteriori probability, estimates the most likely configuration with an optimization algorithm, so as to effectuate vehicle detection.

9 Claims, 10 Drawing Sheets

(52) U.S. Cl.
CPC .......... *G06T 7/0044* (2013.01); *G06T 7/0081* (2013.01); *G06T 7/0083* (2013.01); *G06T 2207/10048* (2013.01); *G06T 2207/20076* (2013.01); *G06T 2207/20144* (2013.01); *G06T 2207/30236* (2013.01); *G06T 2207/30252* (2013.01)

(58) Field of Classification Search
CPC ............ G06K 9/00771; G06K 9/00825; G06T 2207/10048; G06T 2207/20061; G06T 2207/30252
See application file for complete search history.

(56) References Cited

U.S. PATENT DOCUMENTS

2014/0112537 A1* 4/2014 Frank ...................... H04N 5/33
382/103
2015/0210216 A1* 7/2015 Reichel ............... B60W 30/085
701/48

* cited by examiner

VEHICLE DETECTION METHOD BASED ON THERMAL IMAGING

FIELD OF TECHNOLOGY

The present invention relates to vehicle detection methods and more particularly to a vehicle detection method based on thermal imaging.

BACKGROUND

Depending on a means of sensing, the techniques of estimating traffic flow fall into different categories, namely loop coils, ultrasonic, microwave, active, passive, imaging and magnetic induction, and usually involve detecting vehicles shown in images. Among the aforesaid categories of the techniques of estimating traffic flow, imaging-based detection is becoming more important, because it not only measures the number and speeds of vehicles but also estimates data, such as the length of a queue and the diverting flow rate.

The conventional imaging-based detection technique detects vehicles shown in images by light sensing techniques, but its accuracy is easily affected by any changes in the light rays of visible light, and in consequence vehicles shown in images cannot be detected efficiently. In an attempt to overcome the aforesaid drawbacks of the conventional imaging-based detection technique, a thermal imaging camera-based vehicle detection technique (hereinafter referred to as thermal imaging vehicle detection technique) is put forth. The thermal imaging vehicle detection technique entails performing light sensing and imaging by the infrared light emitted from a vehicle and thus is not affected by any changes in the light rays of visible light; hence, it is effective in detecting vehicles shown in images. Specifically speaking, the thermal imaging vehicle detection technique efficiently detects vehicles shown in images by detecting the infrared light which is reflected off vehicle windows or vehicle bottoms shown in the images.

However, the conventional thermal imaging vehicle detection technique relies merely upon a detection algorithm with a single thermal imaging vehicle feature. Although the detection algorithm with a single thermal imaging vehicle feature is able to detect vehicles shown by thermal imaging, it is predisposed to erroneous judgment in vehicle detection due to variation in background thermal radiation between different seasons or because of heavy traffic, thereby deteriorating the stability and accuracy of thermal imaging vehicle detection. Hence, it is important to overcome the aforesaid drawback of the prior art, that is, erroneous judgment in vehicle detection carried out with the thermal imaging vehicle detection technique.

SUMMARY

In view of the aforesaid drawbacks of the prior art, it is an objective of the present invention to enhance the stability and accuracy of thermal imaging vehicle detection.

In order to achieve the above and other objectives, the present invention provides a vehicle detection method based on thermal imaging, adapted to capture a total thermal image of a specific region. The vehicle detection method comprises an initial vehicle likelihood region identifying step, a vehicle component locating step and a vehicle detecting step. The vehicle component locating step includes a vehicle window locating step and a vehicle bottom locating step. In the initial vehicle likelihood region identifying step, a signature cutting algorithm discerns an initial vehicle likelihood regions and a background region in the total thermal image and deducts the background region by a background deduction technique to identify the initial vehicle likelihood region. In the vehicle window locating step, a border detection algorithm and a Hough transform detect an object component which has a feature that a pair of parallel horizontal lines are shown in a thermal image of the initial vehicle likelihood regions and a feature that a center of the thermal image is of low brightness, and the object component is regarded as a located vehicle window. In the vehicle bottom locating step, the border detection algorithm and the Hough transform detect an object component which has a feature that a thermal image of the initial vehicle likelihood regions is slender and a feature that the thermal image is of high brightness, and the object component is regarded as a located vehicle bottom. In the vehicle detecting step, a space geometric relationship of the located vehicle window and vehicle bottom is described with a Markov random field, wherein, if the space geometric relationship conforms with a predetermined space geometric relationship, a region having the vehicle window and vehicle bottom with the space geometric relationship therebetween is regarded as an advanced vehicle likelihood region, thereby detecting a vehicle.

In an embodiment of the present invention, the signature cutting algorithm comprises a pixel point value defining step, a valid vertical area reserving step, a valid horizontal area reserving step and a vehicle likelihood region demarcating step. The pixel point value defining step entails defining a numerical value of each pixel point included in the total thermal image and attributed to a thermal image value larger than the least thermal image value of the vehicle likelihood region. The valid vertical area reserving step entails calculating vertical projections of the numerical values of the pixel points of the total thermal image, cutting out invalid vertical areas with zero vertical projections, and reserving valid vertical areas with none-zero vertical projections. The valid horizontal area reserving step entails calculating horizontal projections of the numerical values of the pixel points of the valid vertical areas, cutting out invalid horizontal areas with zero horizontal projections, and reserving valid horizontal areas with non-zero horizontal projections. The vehicle likelihood region demarcating step entails demarcating the valid horizontal areas as the vehicle likelihood regions. In another embodiment, the valid vertical area reserving step and the valid horizontal area reserving step occur in reverse order, that is, the valid horizontal area reserving step precedes the valid vertical area reserving step.

In an embodiment of the present invention, parameters of the vehicle window are defined as $(c_x, c_y, w, h)$, wherein $(c_x, c_y)$ denotes a center of the vehicle window, and $(w,h)$ denotes width and height of the vehicle window.

In an embodiment of the present invention, the upper horizontal line and the lower horizontal line are defined by equations as follows:

$$M^{(u)}(x, y) = \begin{cases} 1 & \text{if } G_X(x, y) = 0, G_y(x, y) < -Th \\ 0 & \text{otherwise} \end{cases}$$

$$M^{(l)}(x, y) = \begin{cases} 1 & \text{if } G_X(x, y) = 0, G_y(x, y) >= Th \\ 0 & \text{otherwise} \end{cases}$$

wherein $M^{(u)}(x, y)$ denotes the upper horizontal line margin point mask, $M^{(l)}(x, y)$ denotes the lower horizontal line margin point mask, $G_x(x, y)$ denotes a gradient value of the vehicle window in x-direction, $G_y(x, y)$ denotes a gradient value of the vehicle window in y-direction, and Th denotes a configured margin mask threshold.

In an embodiment of the present invention, wherein $u=(u_x, u_y) \in M^{(u)}$ denotes a point of the upper horizontal line, and $l=(l_x, l_y) \in M^{(l)}$ denotes a point of the lower horizontal line, so as to vote for upper and lower horizontal points $S=\{(u, l) | u_x = l_x\}$ on a vertical line and parameter space vehicle window $(c_y, h)$, wherein $$c_y = \frac{u_y + l_y}{2}, h = |u_y - l_y|$$

Wherein, after a parameter space voting result has been obtained, a parameter of region vote maximization is regarded as a possible candidate $H=\{c_y^{(i)}, h^i\}_{i=1}^{N_H}$ of the vehicle window, wherein $N_H$ denotes a number of possible candidates of the vehicle window;

wherein the upper and lower horizontal points $S^{(h)}=\{(u^{(h)}, l^{(h)})\}$ are inferred from all possible parameters $h \in H$ of the vehicle window, and then all the horizontal points are connected, wherein a starting point and an ending point are recorded, when the length of its line is larger than a predetermined threshold, such that a width and coordinates of a center of the vehicle window are defined as follows:

$$c_x = \frac{p_s + p_e}{2}, w = |p_s - p_e|$$

wherein $p_s$ denotes the starting point, and $p_e$ denotes the ending point.

In an embodiment of the present invention, the border detection algorithm is a Sobel operator border detection algorithm.

In an embodiment of the present invention, before the Hough transform algorithm starts, a heat grayscale Gaussian model of the vehicle window is analyzed with a Gaussian model, and then a distance between it and a predetermined heat grayscale Gaussian model corresponding to the vehicle window is calculated, wherein, if the distance is larger than a predetermined threshold, the detection is regarded as wrong, so as to eliminate any wrongly identified vehicle window. The distance is expressed by an equation as follows:

$$d_b = (R_i, R_j) = \frac{1}{8}(\mu_i - \mu_j)^T \left| \frac{\sigma_i + \sigma_j}{2} \right| (\mu_i - \mu_j) + \frac{1}{2} \ln \frac{\left| \frac{\sigma_i + \sigma_j}{2} \right|}{\sqrt{|\sigma_i||\sigma_i|}}$$

wherein $(\mu_i, \sigma_i)$ and $(\mu_j, \sigma_j)$ denote means and standard deviations of the predetermined heat grayscale Gaussian model and the heat grayscale Gaussian model of the vehicle window thermal image region, respectively.

In an embodiment of the present invention, the Markov random field allows a space geometric relationship of the vehicle window and the vehicle bottom to be defined as a label problem, wherein, a graphical model $G=(V, E)$ is provided, wherein $V=\{v_1, v_2, \ldots, v_n\}$ denotes vertices and corresponds to all the detected components of vehicles, wherein $E=\{e_1, e_2, \ldots, e_m\}$ denote edges, indicating adjacent components of vehicles, wherein, according to the aforesaid model, a vehicle detection problem is described as how to match each vertex with one of three possible labels, namely false vertex (0), vehicle window (1), and vehicle bottom (2), wherein, preferably, probability maximization-oriented labeling $F=\{f_1, f_2, \ldots, f_n\}$, and it is defined as follows:

$$Pr(F) = \frac{1}{Z} \prod_{v_i \in V} \phi(f_i) \prod_{(i,j) \in E} \varphi(f_i, f_j)$$

wherein Z denotes a normalization coefficient, $\phi(f_i)$ denotes detected vertices, $v_i$ denotes a confidence index of the vehicle window or the vehicle bottom, and $\phi(f_i, f_j)$ denotes the relationship between two adjacent vertices, with a mixed Gaussian model which enables prior learning.

Therefore, a vehicle detection method and a vehicle detection device for use with the vehicle detection method of the present invention enhance the stability and accuracy of thermal imaging vehicle detection by multiple different features and geometric relationships descriptive thereof.

BRIEF DESCRIPTION

Objectives, features, and advantages of the present invention are hereunder illustrated with specific embodiments in conjunction with the accompanying drawings, in which.

DETAILED DESCRIPTION

Figure 1:
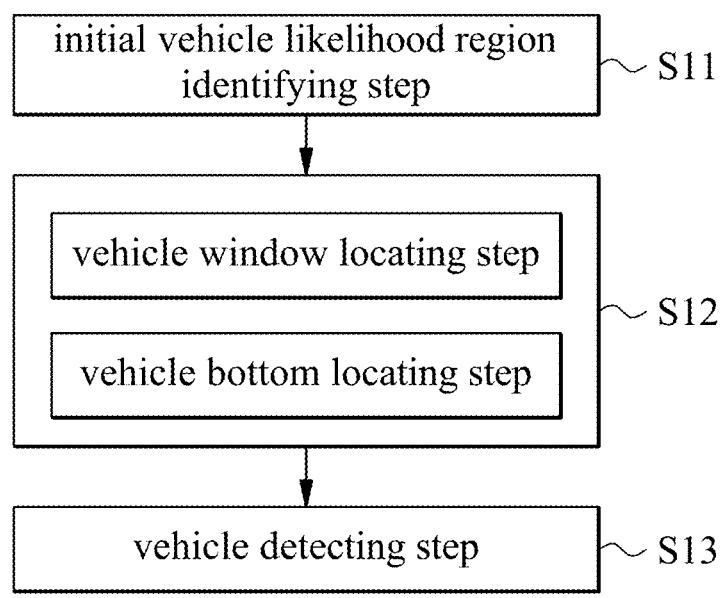
FIG. 1 is a schematic view of the process flow of a vehicle detection method according to an embodiment of the present invention.
Figure 2:
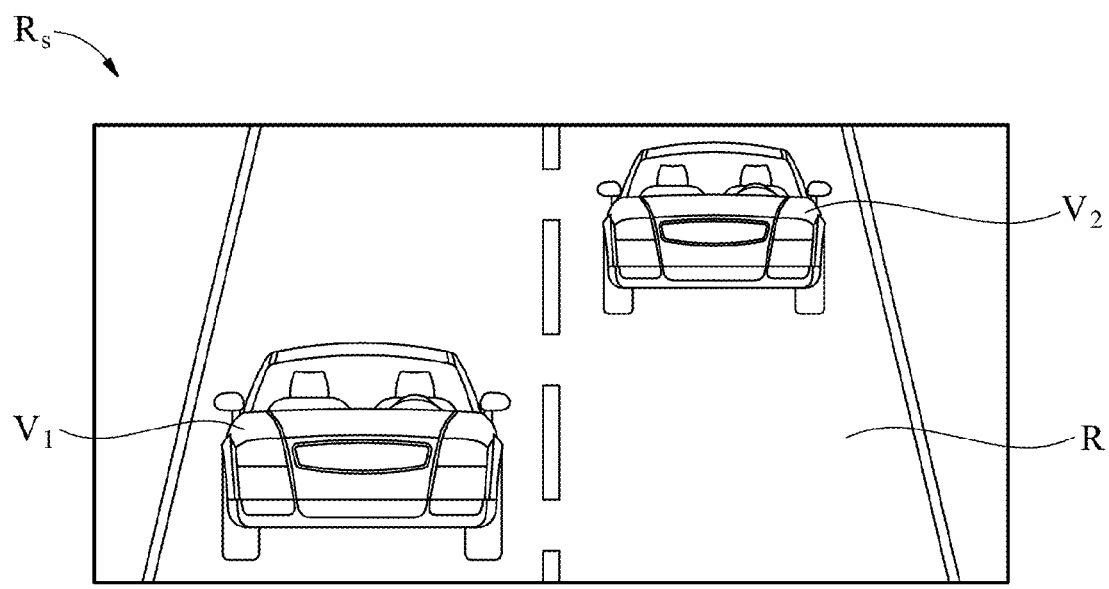
FIG. 2 is a schematic view of a total image according to an embodiment of the present invention.
Figure 3:
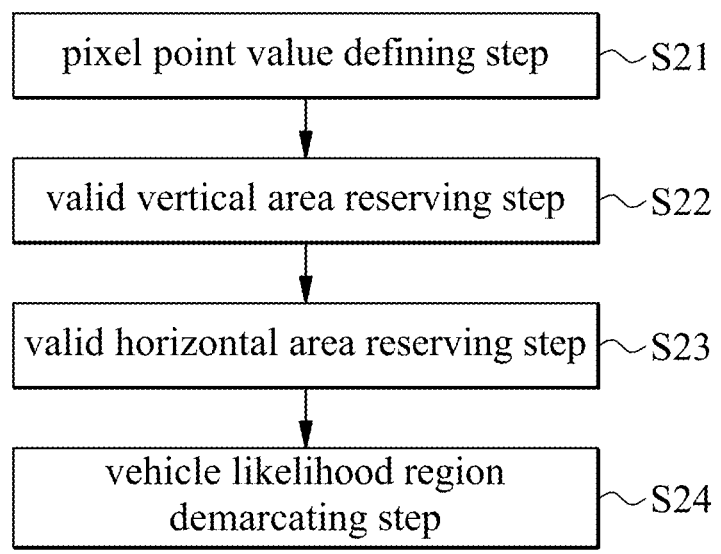
FIG. 3 is a schematic view of the process flow of a signature cutting algorithm according to an embodiment of the present invention.

Referring to FIG. 1, FIG. 2, FIG. 3 and FIG. 4A through FIG. 4D, FIG. 1 is a schematic view of the process flow of a vehicle detection method according to an embodiment of the present invention, FIG. 2 is a schematic view of a total image $I_t$ according to an embodiment of the present invention, FIG. 3 is a schematic view of the process flow of a signature cutting algorithm according to an embodiment of the present invention, and FIG. 4A through FIG. 4D are schematic views of the signature cutting algorithm according to an embodiment of the present invention.

A vehicle detection method based on thermal imaging disclosed in an embodiment of the present invention is adapted to perform vehicle detection. The vehicle detection method involves identifying a total thermal image $TI_t$ of a specific region $R_s$ (shown in FIG. 2), wherein total thermal image $TI_t$ of the specific region $R_s$ is identified by a thermal imaging camera (not shown).

The vehicle detection method comprises an initial vehicle likelihood region identifying step S11, a vehicle component locating step S12 and a vehicle detecting step S13, wherein the vehicle component locating step S12 further comprises a vehicle window locating step and a vehicle bottom locating step.

Referring to FIG. 2, in the initial vehicle likelihood region identifying step S11, the specific region $R_s$ is displayed, and the specific region $R_s$ comprises a road R and two vehicles $V_1,V_2$ traveling on the road R, wherein the arrangement of the road R and two vehicles $V_1,V_2$ in the specific region $R_s$ is hereby presented for illustrative purposes only. The thermal imaging camera captures a total thermal image $TI_t$ of the specific region $R_s$ to show thermal images of the road R and the vehicles $V_1, V_2$.

In an ideal scenario, a traffic flow sensor (not shown) discerns the thermal images of the road R and the vehicles $V_1,V_2$ with the total thermal image $TI_t$ to thereby further calculates and determines that the number of vehicles (i.e., the number of the vehicles $V_1,V_2$) traveling on the road R per unit time is two. However, in practice, with the vehicles $V_1,V_2$ being different from each other in the surface material which they are made from, the distribution of heat on the surfaces of the vehicles $V_1,V_2$ is not uniform, and thus a portion of the thermal images of the vehicles $V_1,V_2$ is likely to mix with the thermal image of the road R. As a result, the portion of the thermal images of the vehicles $V_1,V_2$ is mistakenly attributed to the road R, and in consequence the number of vehicles traveling on the road R per unit time cannot be accurately calculated.

To distinguish the thermal images of the vehicles $V_1,V_2$ from the thermal image of the road R, an embodiment of the present invention entails performing a signature cutting algorithm on the total thermal image It.

Referring to FIG. 2 and FIG. 4A through FIG. 4D, the signature cutting algorithm comprises pixel point value defining step S21, valid vertical area reserving step S22, valid horizontal area reserving step S23 and vehicle likelihood region demarcating step S24

Figure 4A:
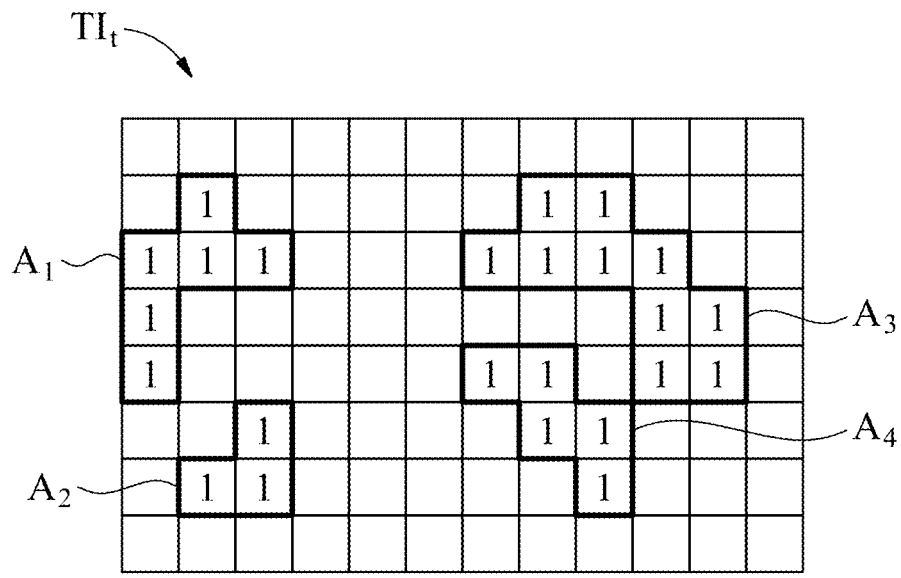
FIG. 4A through FIG. 4D are schematic views of the signature cutting algorithm according to an embodiment of the present invention.

Referring to FIG. 4A, in the pixel point value defining step S21, the pixel points in a foreground region (i.e., thermal images of the vehicles $V_1,V_2$) identified in the total thermal image $TI_t$ are marked with the sign "1", whereas the pixel points in a background region (i.e., thermal images attributed to the vehicles $V_1,V_2$ but mistakenly identified as the thermal image of the road R) identified in the total thermal image $TI_t$ are not.

The signs marked in FIG. 4A show that, in the total thermal image $TI_t$, those pixel points marked with "1" are divided into four groups located at four areas $A_1, A_2, A_3, A_4$ (demarcated by bold lines), respectively. However, in practice, there should be only two areas (because there are only two vehicles $V_1, V_2$); hence, the total thermal image $TI_t$ must undergo image processing further. In this regard, the present invention precludes the aforesaid errors by performing advanced analysis and processing with the signature cutting algorithm.

Figure 4B:
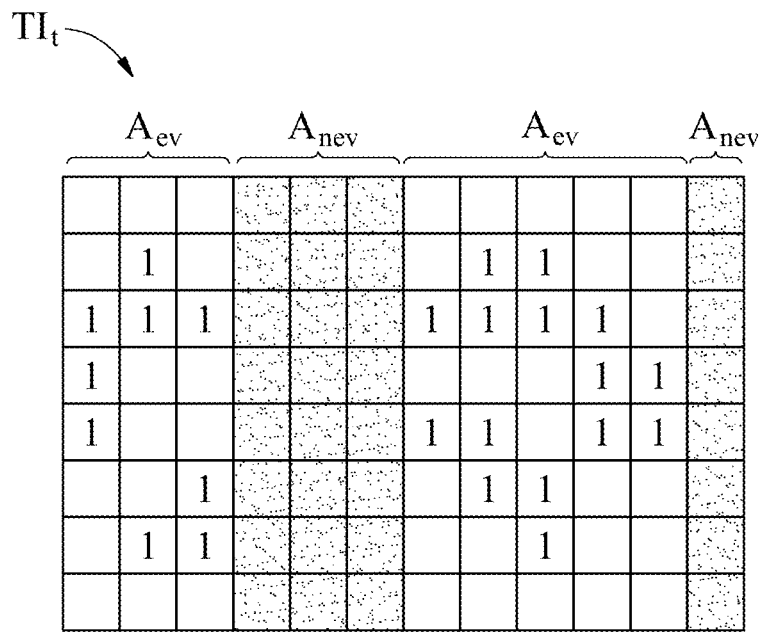

Referring to FIG. 4B, in the valid vertical area reserving step S22, the vertical projections $P_v$ of the values of the pixel points of the total thermal image $TI_t$ are calculated to be 3, 3, 4, 0, 0, 0, 2, 4, 4, 3, 2, 0 from left to right, and invalid vertical areas $A_{nev}$ whose vertical projections are zero are cut out so as to reserve valid vertical areas $A_{ev}$ whose vertical projections are not zero, wherein the invalid vertical areas $A_{nev}$ are colored in gray.

Figure 4C:
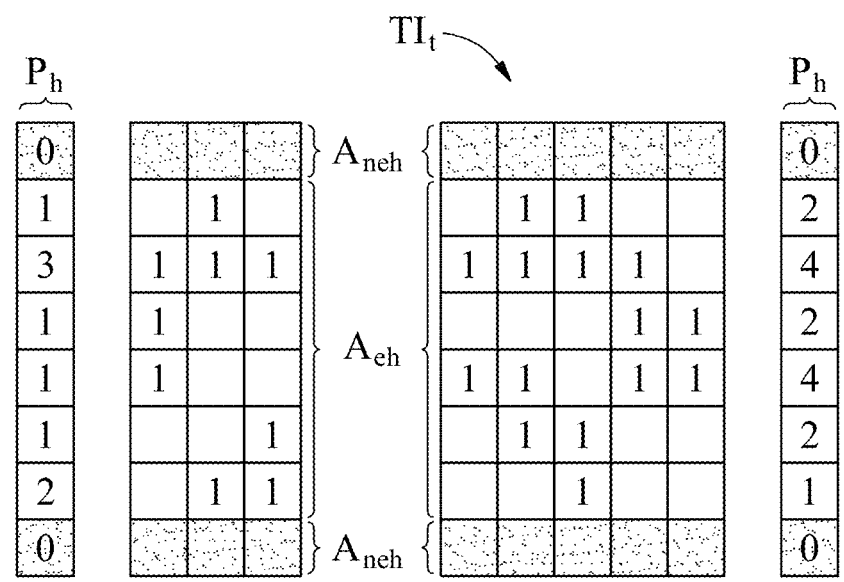

Referring to FIG. 4C, in the valid horizontal area reserving step S23, horizontal projections $P_h$ of the values of the pixel points in the valid vertical areas are calculated to be 0, 1, 3, 1, 1, 1, 2, 0 (from top to bottom) on the left and 0, 2, 4, 2, 4, 2, 1, 0 (from top to bottom) on the right, and invalid horizontal areas $A_{neh}$ whose horizontal projections are zero are cut out so as to reserve valid horizontal areas $A_{eh}$ whose horizontal projections are not zero, wherein the invalid vertical areas $A_{neh}$ are colored in gray.

Figure 4D:
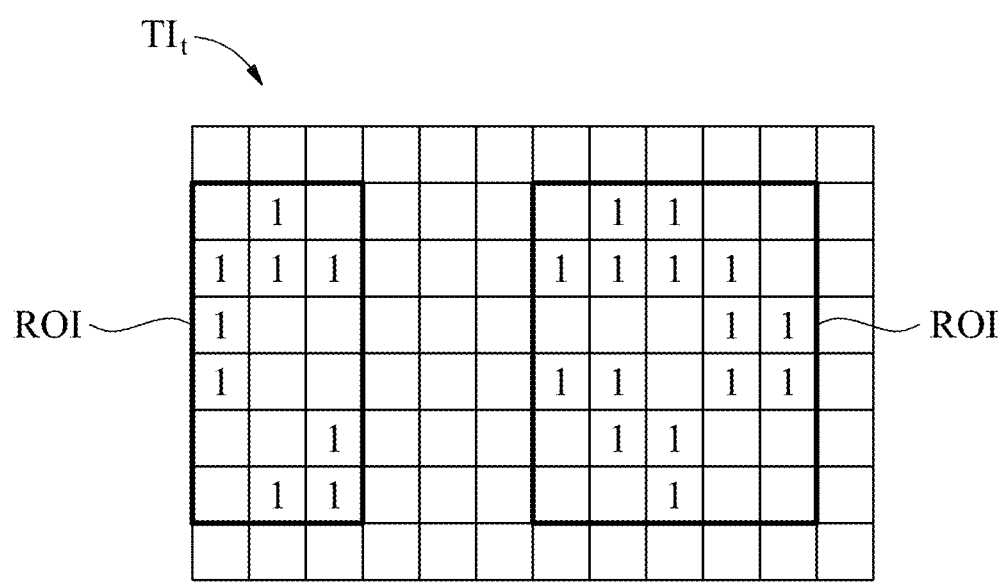

Referring to FIG. 4D, in the vehicle likelihood region demarcating step S24, the valid horizontal areas $A_{eh}$ are demarcated as the initial vehicle likelihood regions $ROI_1$ such that the initial vehicle likelihood regions $ROI_1$ in the total thermal image $TI_t$ fall within two areas, respectively, and the two areas correspond to two vehicles $V_1$, $V_2$, respectively.

In another embodiment, when using the signature cutting algorithm, the pixel point value defining step S21 is followed by the valid horizontal area reserving step S23, the valid vertical area reserving step S22, and the vehicle likelihood region demarcating step S24 sequentially.

By following the above steps, the initial vehicle likelihood regions $ROI_1$ can be confirmed, and thus it is confirmed that the total thermal image $TI_t$ is divided into two areas (demarcated by bold lines). After the initial vehicle likelihood regions $ROI_1$ has been confirmed, the background region is deducted by a background deduction technique to identify the initial vehicle likelihood regions $ROI_1$.

However, the initial vehicle likelihood regions $ROI_1$ is a piece of vehicle-related information which is not complete and correct; hence, it is necessary for the initial vehicle likelihood regions $ROI_1$ to undergo image processing further in order to acquire complete and correct vehicle information. The aforesaid complete and correct vehicle information is hereunder known as an advanced vehicle likelihood region $ROI_2$.

To obtain the advanced vehicle likelihood region $ROI_2$, components, such as a vehicle window and a vehicle bottom, of the vehicles $V_1, V_2$ are located to thereby further confirm the vehicles $V_1, V_2$. For example, if two vehicle bottoms are located in a locating step, it means that there are only two vehicles (because each vehicle can have only one vehicle bottom).

Moreover, since vehicle windows and vehicle bottoms each have obvious features, the locating step is dedicated to locating vehicle windows and vehicle bottoms, but the present invention is not limited thereto; instead, any vehicle component can be regarded as one which can be located, provided that the vehicle component has an obvious feature.

Locating a vehicle window requires that features of a thermal image of the vehicle window be defined as follows: (1) the thermal image shows a pair of parallel horizontal lines (i.e., an upper horizontal line and a lower horizontal line); and (2) the center of the thermal image is of low brightness.

To find a region attributed to the initial vehicle likelihood regions $ROI_1$ and indicative of a feature of the vehicle window, this embodiment involves performing a detection process with the border detection algorithm and the Hough transform. Specifically speaking, this embodiment entails using a Sobel operator border detection algorithm mask to detect a horizontal line, and, in particular, using the mask to calculate an x-direction gradient and a y-direction gradient to thereby detect the margin of a vehicle component having the feature. Regarding a horizontal line, since its left and right thermal image values are substantially symmetrically distributed, the mask value of its x-direction gradient value $G_x$ should approach 0, whereas the y-direction gradient value $G_y$ of the upper horizontal line of the vehicle window is a negative value because the thermal image value of its upper half is large. Conversely, the lower horizontal line of the vehicle window is a positive value The parameters of the vehicle window are defined as $(c_x, c_y, w, h)$, wherein $(c_x, c_y)$ denote the center of the vehicle window, and $(w, h)$ denote the width and height of the vehicle window. The upper horizontal line and the lower horizontal line are defined by equations as follows:

$$M^{(u)}(x, y) = \begin{cases} 1 & \text{if } G_X(x, y) = 0, G_y(x, y) < -Th \\ 0 & \text{otherwise} \end{cases}$$

$$M^{(l)}(x, y) = \begin{cases} 1 & \text{if } G_X(x, y) = 0, G_y(x, y) >= Th \\ 0 & \text{otherwise} \end{cases}$$

wherein $M^{(u)}(x,y)$ denotes the upper horizontal line margin point mask, $M^{(l)}(x, y)$ denotes the lower horizontal line margin point mask, $G_X(x, y)$ denotes the gradient value of the vehicle window in the x-direction, $G_y(x, y)$ denotes the gradient value of the vehicle window in the y-direction, and Th denotes a configured margin mask threshold.

Then, $u=(u_x, u_y) \in M^{(u)}$ denotes a point of the upper horizontal line, and $l=(l_x, l_y) \in M^{(l)}$ denotes a point of the lower horizontal line, so as to vote for upper and lower horizontal points $S=\{(u, l)|u_x=l_x\}$ on a vertical line and parameter space vehicle window $(c_y, h)$, wherein $$c_y = \frac{u_y + l_y}{2}, h = |u_y - l_y|$$

After a parameter space voting result has been obtained, a parameter of region vote maximization is regarded as a possible candidate $H=\{c_y^{(i)}, h^i\}_{i=1}^{N_H}$ of the vehicle window, wherein $N_H$ denotes the number of possible candidates of the vehicle window. The upper and lower horizontal points $S^{(h)}=\{(u^{(h)}, l^{(h)})\}$ are inferred from all the possible parameters $h \in H$ of the vehicle window. Afterward, all the horizontal points are connected; a starting point and an ending point are recorded, when the length of its line is larger than a predetermined threshold. Then, the width and coordinates of the center of the vehicle window are defined as follows:

$$c_x = \frac{p_s + p_e}{2}, w = |p_s - p_e|$$

wherein $p_s$ denotes the starting point, and $p_e$ denotes the ending point.

Given the processing and computation performed with the aforesaid equations, it is feasible to identify a region and position which conform with the features of the vehicle window such that the vehicle window can be clearly located.

However, due to background noise and vehicle concealment, the aforesaid Hough transform algorithm yields plenty results of erroneous vehicle window detection. To solve the aforesaid problem effectively, an embodiment of the present invention entails analyzing and expressing the distribution of brightness (i.e., usually the distribution of low heat) of vehicle windows in a thermal image in advance with a Gaussian model, and calculating the distance between it and heat grayscale brightness attributed to the vehicle window region and detected with the Gaussian model. If the distance is larger than a configured threshold, the detection is regarded as wrong. Therefore, a wrongly-identified vehicle window can be efficiently ruled out.

If $(\mu_i, \sigma_i)$ and $(\mu_j, \sigma_j)$ denote the means and standard deviations of the model and the vehicle window Gaussian distribution, respectively, then the distance between the two distributions is defined as the Bhattacharyya distance and expressed by the equation below.

$$d_b = (R_i, R_j) = \frac{1}{8}(\mu_i - \mu_j)^T \left|\frac{\sigma_i + \sigma_j}{2}\right|^{-1}(\mu_i - \mu_j) + \frac{1}{2}\ln\frac{\left|\frac{\sigma_i + \sigma_j}{2}\right|}{\sqrt{|\sigma_i||\sigma_j|}}$$

After the vehicle window has been located, the vehicle bottom has to be located. The features of the thermal image of the vehicle bottom include: (1) it is slender; and (2) the thermal image taken with a thermal imaging camera is of high brightness (because heat generated from the vehicle in operation reflects off the ground to reach the vehicle bottom).

To find any feature indicative of the vehicle window in the initial vehicle likelihood regions $ROI_1$, this embodiment involves performing a detection process with the border detection algorithm and the Hough transform too. Specifically speaking, the detection process entails detecting all the horizontal marginal points in a thermal image, recording the position of a shade with a one-dimensional flag array, wherein each element in an array is initialized to 0, moving the array in the down-to-top direction, and setting any related flag to 1 if the related position is a shaded element. If, in the array, the ratio of the flags carrying the value "1" to those not carrying the value "1" is larger than a configured threshold, the array vertical coordinate will be recorded and regarded as the vertical coordinate of the vehicle bottom.

Specifically speaking, high-brightness pixel points in a foreground image are identified by thresholding as follows:

$$I_b(x, y) = \begin{cases} 255 & \text{if } I(x, y) \geq Th_b \\ 0 & \text{otherwise} \end{cases}$$

wherein $Th_b$ denotes a brightness threshold.

After the horizontal lines of all possible vehicle bottoms have been identified, each line is regarded as a region of a vehicle bottom. Afterward, paired adjacent regions of a pair of vehicle bottoms in the y-direction are integrated to form a region of a vehicle bottom if the horizontal overlap ratio of the lines is larger than a configured threshold; this integration process will repeat until no more regions of vehicle bottoms are available for integration. $l_1$ and $l_2$ denote horizontal lengths of regions of two vehicle bottoms, respectively, and are defined as the lengths of their horizontal overlap lines, respectively, and thus overlap ratio OR $(l_1, l_2)$ is defined with the equation below.

$$OR(l_1, l_2) = \max\left(\frac{|l|}{|l_1|}, \frac{|l|}{|l_2|}\right)$$

Upon computation and processing with the above equations, the positions of the vehicle bottoms can be identified and thus clearly located.

After the vehicle windows and the vehicle bottoms have been located, the vehicle detecting step S13 begins and entails detecting a space geometric relationship of the vehicle windows and the vehicle bottoms.

In the vehicle detecting step S13, this embodiment entails describing, with a Markov random field, a space geometric relationship of the vehicle windows and the vehicle bottoms which have been located and then estimating the most likely configuration with an optimization algorithm whereby, if the space geometric relationship conforms with a predetermined space geometric relationship, any region where a vehicle window and a vehicle bottom associated with each other by the space geometric relationship are present is regarded as the advanced vehicle likelihood region $ROI_2$, so as to obtain complete vehicle-related information, thereby detecting the vehicles.

Furthermore, the Markov random field allows a vehicle detection problem to be defined as a label problem. The Markov random field describes a space geometric relationship of objects according to a data structure which is graphically presented. Assuming that a graphical model G=(V, E) is provided, wherein V={$v_1, v_2, \ldots, v_n$} denotes vertices and corresponds to all the detected components of vehicles, wherein E={$e_1, e_2, \ldots, e_m$} denote edges, indicating adjacent components of vehicles. According to the aforesaid model, a vehicle detection problem can be described as how to match each vertex with one of three possible labels, namely false vertex (0), vehicle window (1), and vehicle bottom (2), wherein, preferably, probability maximization-oriented labeling F={$f_1, f_2, \ldots, f_n$}, and it is defined as follows:

$$Pr(F) = \frac{1}{Z}\prod_{c \in C}\psi_c(f_c) = \frac{1}{Z}\varphi(f_i)\frac{1}{Z}\prod_{(i,j) \in E}\varphi(f_i, f_j)$$

wherein Z denotes a normalization coefficient, $\phi(f_i)$ denotes detected vertices, $v_i$ denotes a confidence index of a vehicle window or vehicle bottom, and $\phi(f_i, f_j)$ denotes the relationship between two adjacent vertices, with a mixed Gaussian model which enables prior learning.

Figure 5A:
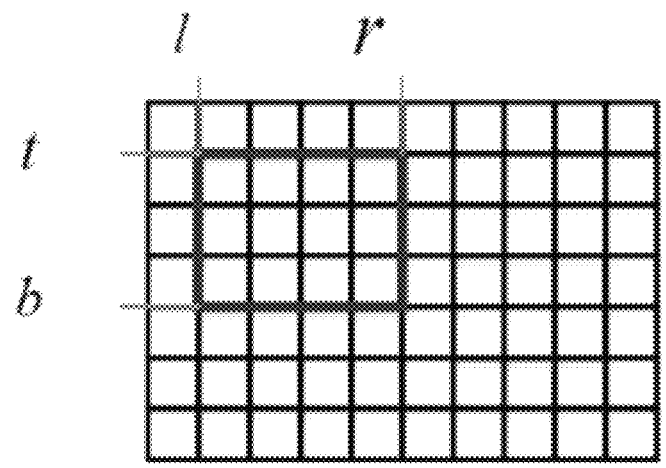
FIG. 5A is a schematic view of a hypothetic rectangular parameter based on a Markov random field according to an embodiment of the present invention.
Figure 5B:
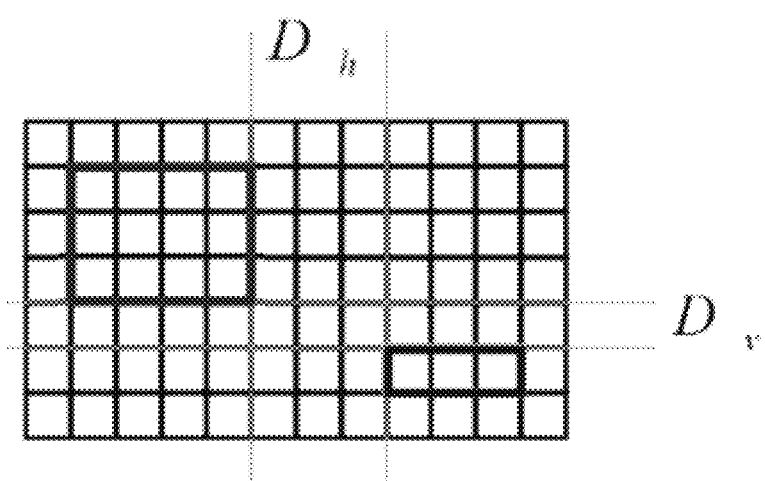
FIG. 5B is a schematic view of hypothetic horizontal and vertical distance definitions in vehicle detection based on a Markov random field according to an embodiment of the present invention.

Specifically speaking, the thermal image regions of vehicle windows and vehicle bottoms are presumably expressed as {$H_1^{(w)}, H_2^{(w)}, \ldots, H_{N_w}^{(w)}$} and {$H_1^{(u)}, H_2^{(u)}, \ldots, H_{N_u}^{(u)}$}, respectively, and the region corresponding to each component of a vehicle is presumably described with a rectangle, wherein its parameter expression is H={l, r, t, b} (shown in FIG. 5A), wherein {l, r, t, b} denotes the coordinates of the left, right, top and bottom sides of the rectangle, respectively. The vertical distance $D_v$ (.) and horizontal distance $D_h$ (.) between the components of two vehicles are defined with equations below; if their values are less than zero, it means that the two hypotheses overlap in the direction. FIG. 5B is a schematic view of the definitions of the vertical distance $D_v$ (.) and horizontal distance $D_h$ (.), and related equations are as follows:

$$D_h(H_i, H_j) = \max(l_i, l_j) - \min(r_i, r_j)$$

$$D_v(H_i, H_j) = \max(t_i, t_j) - \min(b_i, b_j)$$

Figure 6:
FIG. 6 are schematic views of vehicle detection based on a Markov random field according to an embodiment of the present invention.
Figure 6:
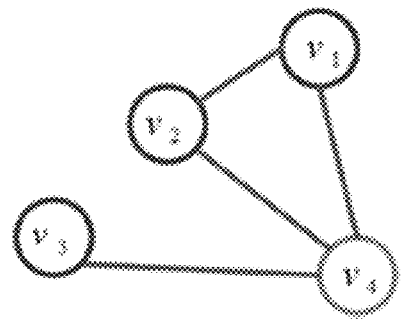

The Markov random field describes the space geometric relationship of an object according to a data structure which is graphically presented. The aforesaid graphical representation is characterized in that each element in a vertex set corresponds to a component of the aforesaid vehicle. Each element in an edge set connects with two vertices, if there is spatial geometric dependency between the two. Referring to the left diagram of FIG. 6, three vehicle windows (demarcated by three rectangular boxes, and the rectangular boxes are positioned at the top, windshield and hood of the vehicle, from top to bottom, respectively and substantially) and a vehicle bottom (demarcated by a rectangular box, and the rectangular box is positioned at the bottom of the vehicle substantially) correspond to the vertices in the right diagram, respectively. Referring to the right diagram of FIG. 6, a connection line between two vertices indicates the presence of spatial dependency, whereas the spatial dependency between the components of the vehicles are explained and defined below.

Figure 7:
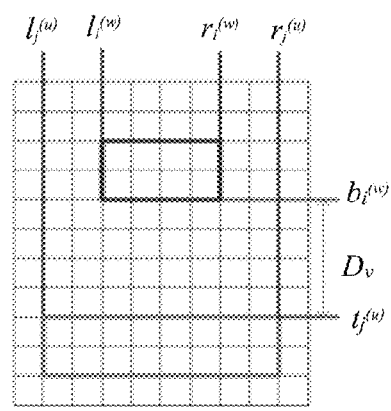
FIG. 7 are schematic views of dependency between a vehicle window and a vehicle bottom in vehicle detection based on a Markov random field according to an embodiment of the present invention.
Figure 7:

Regarding the hypothesis of the presence of a vehicle window $H_i^{(w)}$ and a vehicle bottom $H_j^{(u)}$, if both of them satisfy three rules defined below (as shown in FIG. 7 in which, the top rectangular box in the left diagram corresponds to the windshield of the vehicle in the right diagram, and the bottom rectangular box corresponds to the bottom of the vehicle in the right diagram, wherein a connection line connects the windshield and bottom in the right diagram and indicates the presence of spatial dependency), it means that between them there is a spatial dependency:

(1) $H_j^{(u)}$ is below $H_i^{(w)}$, i.e., $b_i^{(w)} < t_j^{(u)}$; (2) in the horizontal direction, $H_j^{(u)}$ includes $H_i^{(w)}$, i.e., $l_i^{(w)} > l_j^{(u)}$ and $r_i^{(w)} < r_j^{(u)}$; and (3) assume that the vertical distance between $H_i^{(w)}$ and $H_j^{(u)}$ is small and is defined as:

$$D_v(H_i^{(w)}, H_j^{(u)}) \leq 4 \times (b_i^{(w)} - t_j^{(u)})$$

Regarding the vehicle window, it is assumed that $H_i^{(w)}$ and $H_j^{(w)}$ must satisfy two criteria:
(1) assume that $H_i^{(w)}$ and $H_j^{(w)}$ overlap each other in the horizontal direction, i.e., $D_v(H_i^{(w)}, H_j^{(w)}) \leq 0$; and (2) assume the vertical distance between $H_i^{(w)}$ and $H_j^{(w)}$ is small and is defined as:

$$(H_i^{(w)}, H_j^{(w)}) \leq \max(b_i^{(w)} - t_i^{(w)}, b_j^{(w)} - t_j^{(w)})$$

Figure 8:
FIG. 8 are schematic views of spatial dependency satisfied by a vehicle window and a vehicle bottom in vehicle detection based on a Markov random field according to an embodiment of the present invention.

Regarding the vehicle bottom, it is assumed that $H_i^{(u)}$ and $H_j^{(u)}$ must satisfy a criterion: assume that $H_i^{(u)}$ and $H_j^{(u)}$ overlap each other in the horizontal direction, i.e., $D_h(H_i^{(u)}, H_j^{(u)}) \leq 0$ Referring to FIG. 8, there are shown schematic views (left and right) of spatial dependency satisfied by a vehicle window and a vehicle bottom in vehicle detection based on a Markov random field according to an embodiment of the present invention. As shown in FIG. 8, both the vehicle window and the vehicle bottom are demarcated by a rectangular box, whereas a connection line connects the vehicle window and the vehicle bottom.

Since the relationship of vehicle components is graphically expressed according to the aforesaid Markov random field, it is assumed that $f_i$ denotes a random variable for matching vertices $v_i$ with labels $l_i \in L = \{0_u, 1_u, 0_w, 1_w\}$, wherein $(0_u, 1_u)$ denotes regions of false and true vehicle bottoms, respectively, and $(0_w, 1_w)$ denotes regions of false and true vehicle windows, respectively. $\Omega = \{l_1, l_2, \ldots, l_{|V|}\}$ denotes a configuration, i.e., a likelihood hypothesis, wherein a vehicle detection problem is described as putting forth a hypothesis which conforms best with existing image observations in a possible configuration of configuration space $4^{|V|}$. In this embodiment, the configuration hypothesis is defined as a maximum a posteriori probability (MAP) approach to currently observed images so as to assume a configuration $\tilde{\Omega}$ for maximizing a posteriori probability as follows:

$$\tilde{\Omega} = \underset{\Omega}{\operatorname{argmax}} Pr(\Omega \mid O)$$

$$\tilde{\Omega} = \underset{\Omega}{\operatorname{argmax}} Pr(O \mid \Omega) Pr(\Omega)$$

wherein $Pr(O|\Omega)$ expresses a likelihood probability, and $Pr(\Omega)$ expresses a prior probability.

Figure 9:
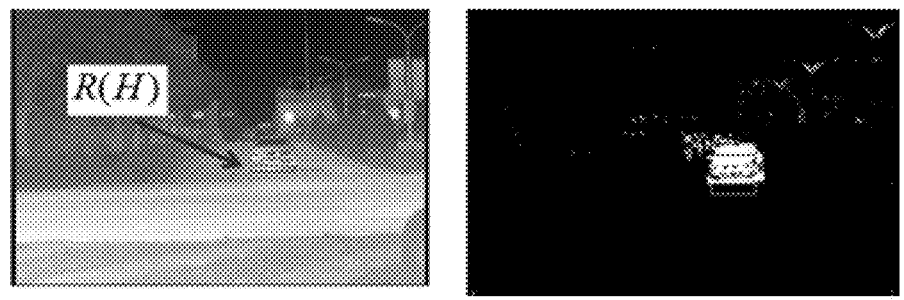
FIG. 9 are schematic views of definitions of a normalized average gray and a foreground ratio in vehicle detection based on a Markov random field according to an embodiment of the present invention.

To define a likelihood probability, it is necessary to define normalized average gray $\gamma_I$ and foreground ratio $\gamma_F$:

$$\gamma_I = \frac{\sum_{p \in R(H)} I(p)}{255 \times \sum_{p \in R(H)} 1} \quad \gamma_F = \frac{\sum_{p \in R(H)} M_F(p)}{\sum_{p \in R(H)} 1}$$

wherein R(H) denotes a rectangular region defined by hypothesis H (the left diagram of FIG. 9 shows that the vehicle bottom is demarcated by a rectangular box, and the right diagram of FIG. 9 shows that the vehicle window and vehicle bottom are each demarcated by a rectangular box). Under the assumption that vehicle components are independent of each other, the likelihood probability is expressed as:

$$Pr(O \mid \Omega) = \prod_{v_i \in V} Pr(O \mid v_i = l_i)$$

Since a region of a vehicle window differs from a region of a vehicle bottom in average brightness and foreground ratio, two sigmoid functions are defined and adapted to calculate the likelihood probability of each vehicle component as follows:

$$Pr(O \mid l_i = 0_w) = Pr(O \mid l_i = 1_u) = \frac{1}{1 + \exp\{(1.0 - \gamma_I) + \gamma_F\}}$$

$$Pr(O \mid l_i = 1_w) = Pr(O \mid l_i = 0_u) = \frac{1}{1 + \exp\{\gamma_I + (1.0 - \gamma_F)\}}$$

The prior probability $Pr(\Omega)$ is based on the Markov random field model and adapted to define and describe a spatial dependency between vehicle components. In general, the prior probability is defined as follows:

$$Pr(\Omega) = \prod_{v_i \in V} \phi(v_i = l_i) \prod_{(i,j) \in E} \varphi(v_i = l_i, v_j = l_j)$$

wherein $\phi(v_i = l_i)$ expresses a singleton probability; $\phi(v_i = l_i, v_j = l_j)$ expresses a pairwise probability.

The singleton probability mainly specifies whether a vehicle component is truly probable. In this embodiment, a confidence index a of the position of a vehicle component is used as a basis of calculation and defined as follows:

$$\phi(l_i = 0_u) = \phi(l_i = 0_w) = \frac{1}{1 + \exp\{\alpha\}}$$

$$\phi(l_i = 1_u) = \phi(l_i = 1_w) = \frac{1}{1 + \exp\{1.0 - \alpha\}}$$

The pairwise probability mainly describes the hypothetic relation of mutual spatial dependency between vehicle components, wherein if $e = \{v_i, v_j\}$ and its corresponding hypothesis is about the region of a vehicle bottom, then only one of the two hypotheses is true vehicle bottom ($l_i = 0_u, l_j = 1_u$) or ($l_i = 1_u, l_j = 0_u$) with high probability, set it to 1.0; if both are wrongly identified vehicle bottom's region ($l_i = 0_u, l_j = 0_u$) with low probability, set it to 0.5; when both are true vehicle bottom's region ($l_i = 1_u, l_j = 1_u$), then the probability is inversely proportional to mutual horizontal overlap ratio and is defined by equations as follows:

$$\varphi(l_i = 0_u, l_j = 1_u) = 1.0$$

$$\varphi(l_i = 1_u, l_j = 0_u) = 1.0$$

$$\varphi(l_i = 0_u, l_j = 0_u) = 0.5$$

$$\varphi(l_i = 1_w, l_j = 1_w) = 1.0 - \frac{-D_h(H_i, H_j)}{\max(r_i - l_i, r_j - l_j)}$$

Figure 10:
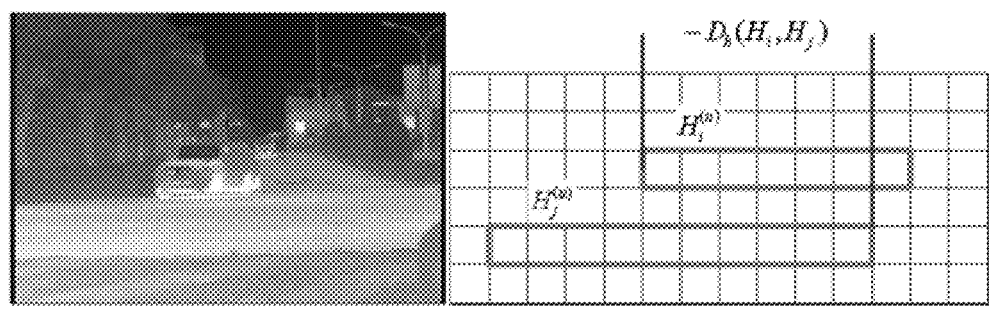
FIG. 10 are schematic views of explanation of definitions of pairwise probability mutually attributed to regions of vehicle bottoms in vehicle detection based on a Markov random field according to an embodiment of the present invention.

The above equations are illustrated with FIG. 10 which are schematic views of explanation of definitions of pairwise probability mutually attributed to regions of vehicle bottoms in vehicle detection based on a Markov random field according to an embodiment of the present invention. The two rectangular boxes (i.e., vehicle bottoms $H_i^{(u)}$ and $H_j^{(u)}$) in the right diagram of FIG. 10 correspond to the hood and bottom of the vehicle in the left diagram of FIG. 10, respectively, in the top-to-bottom order.

When two hypotheses mutually dependent on each other are about vehicle windows, their pairwise probability is similar to the regions of the aforesaid vehicle bottoms in terms of definition and concept. The main difference between them is as follows: if both are about vehicle window regions ($l_i=1_w$, $l_i=1_w$), then the probability is inversely proportional to their overlap ratio, wherein overlap ratio OR(.) is defined as follows:

$$OR(R(H_i), R(H_j)) = \frac{R(H_i) \cap R(H_j)}{R(H_i) \cup R(H_j)}$$

Figure 11:
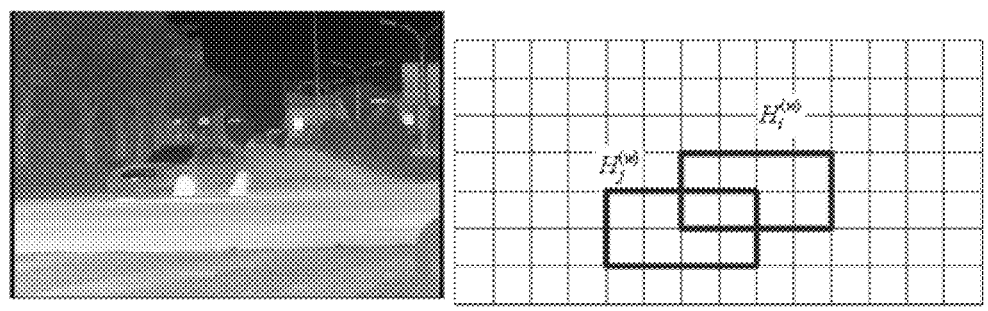
FIG. 11 are schematic views of explanation of definitions of pairwise probability mutually attributed to regions of vehicle windows in vehicle detection based on a Markov random field according to an embodiment of the present invention.

Regarding a hypothesis about vehicle windows with spatial dependency, its pairwise probability is defined as follows:

$\phi(l_i=0_w, l_i=1_w)=1.0$ $\phi(l_i=1_w, l_i=0_w)=1.0$ $\phi(l_i=0_w, l_i=0_w)=0.5$ $\phi(l_i=1_w, l_i=1_w)=1.0-OR(R(H_i),R(H_j))$ The above equations are illustrated with FIG. 11 which are schematic views of explanation of definitions of pairwise probability mutually attributed to regions of vehicle windows in vehicle detection based on a Markov random field according to an embodiment of the present invention. The two rectangular boxes (i.e., vehicle windows $H_i^{(w)}$ and $H_j^{(w)}$) in the right diagram of FIG. 11 correspond to the hood, windshield and top of the vehicle in the left diagram of FIG. 11, respectively, in the top-to-bottom order.

When two hypotheses are about regions of vehicle windows and vehicle bottoms, respectively, the pairwise probability is defined as follows:

$\varphi(l_i = 0_u, l_i = 1_w) = 0.5$ $\varphi(l_i = 1_u, l_i = 0_w) = 0.5$ $\varphi(l_i = 0_u, l_i = 0_w) = 0.0$ $\varphi(l_i = 1_u, l_i = 1_w) = 1.0 - \frac{|(l_i + r_i) - (l_j + r_j)|}{2 \times (r_i - l_i)}$ The aforesaid design concept is based on the fact that it is impossible for both to simultaneously direct to wrongly identified components of vehicles; hence, the probability is set to 0.0; the probability that both are simultaneously true is inversely proportional to the distance between the central positions of both.

Figure 12:
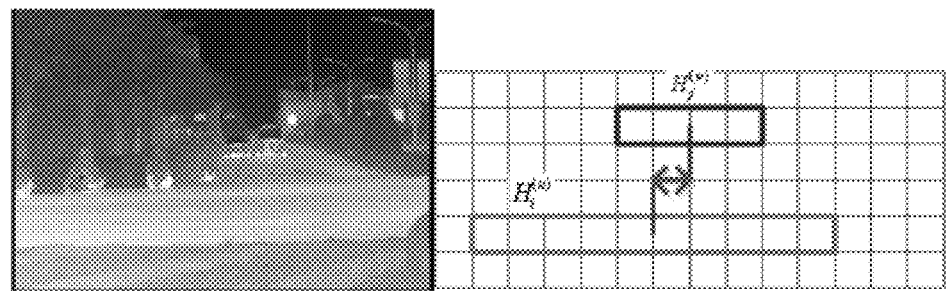
FIG. 12 are schematic views of explanation of definitions of pairwise probability of regions of a true vehicle window and a true vehicle bottom in vehicle detection based on a Markov random field according to an embodiment of the present invention.

The above equations are illustrated with FIG. 12 which are schematic views of explanation of definitions of pairwise probability of regions of a true vehicle window and a true vehicle bottom in vehicle detection based on a Markov random field according to an embodiment of the present invention. The two rectangular boxes (i.e., vehicle window $H_j^{(w)}$ and vehicle bottom $H_i^{(u)}$) in the right diagram of FIG. 12 correspond to the windshield and bottom of the vehicle in the left diagram of FIG. 12, respectively, in the top-to-bottom order.

The vehicle detection method based on thermal imaging in this embodiment is further described below with an example.

Figure 13:
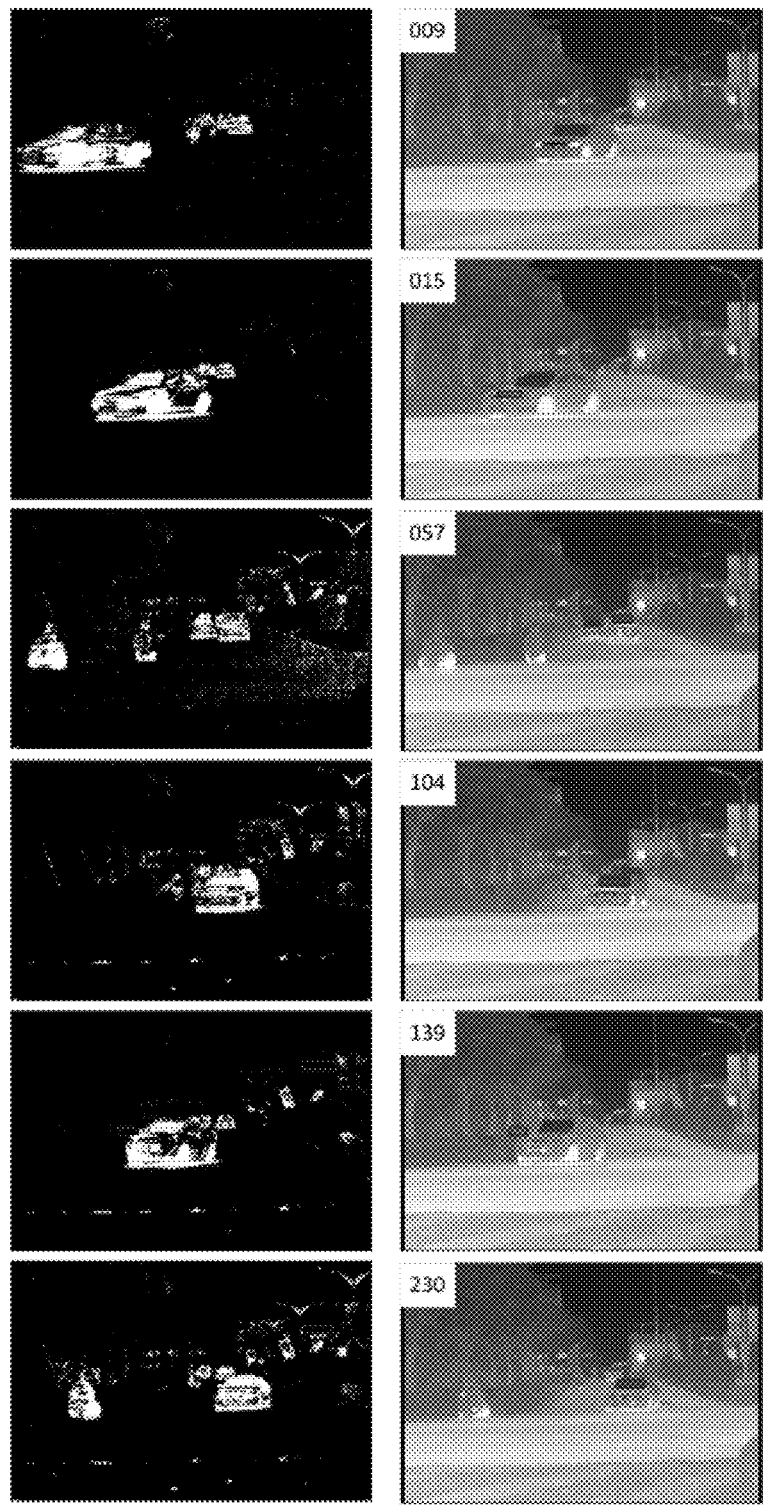
FIG. 13 are schematic views (left) of results of cutting the foreground of videos shot and schematic views (right) of results of detecting components of a vehicle according to an embodiment of the present invention.

Referring to FIG. 13, there are shown schematic views (left) of results of cutting the foreground of videos shot and schematic views (right) of results of detecting components of a vehicle according to an embodiment of the present invention. FIG. 13 shows mainly a vehicle window (demarcated by a rectangular box above) and a vehicle bottom (demarcated by a rectangular box below), wherein the numbers shown at the upper left corners of the pictures are image serial numbers, respectively. The image cutting results reveal: plenty of backgrounds are wrongly identified as foregrounds, because the backgrounds of the scenes of the picture-taking process are quite complicated; with a vehicle being similar to its background in terms of thermal radiation, the vehicle is wrongly identified as its background; hence, the resultant foreground regions do not match objects in motion, including vehicles, motorcycles and pedestrians, effectively and completely.

Hence, in this embodiment, components of vehicles are detected with the vehicle detection method according to foreground cutting results. Regions of vehicle windows and vehicle bottoms are two obvious features in thermal images of vehicles. Vehicle components in thermal images are effectively detected with the aforesaid detection algorithm. However, due to background noise, background regions are wrongly identified as vehicle components which are numbered 139 and 230 in FIG. 13. Furthermore, due to non-uniform distribution of thermal radiation of the vehicle body region, the vehicle body is wrongly identified as a vehicle component which is numbered 015 in FIG. 13. The front end of the engine exhibits a substantially quadrilateral pattern of distribution of heat energy and thus is wrongly identified as a vehicle window. Since vehicles hide each other, some of their components cannot be effectively detected; for example, the bottom of the rear vehicle which is numbered 104 in FIG. 13 cannot be detected because of the concealment problem.

Figure 14:
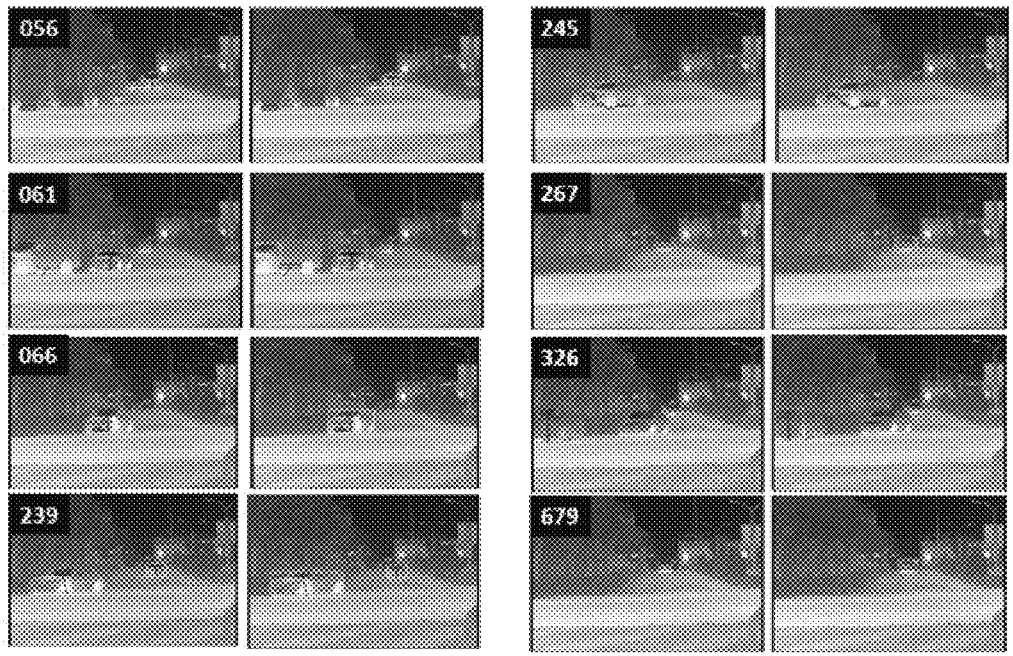
FIG. 14 are schematic views of results of vehicle detection which singleton probability is introduced into according to an embodiment of the present invention.
Figure 15:
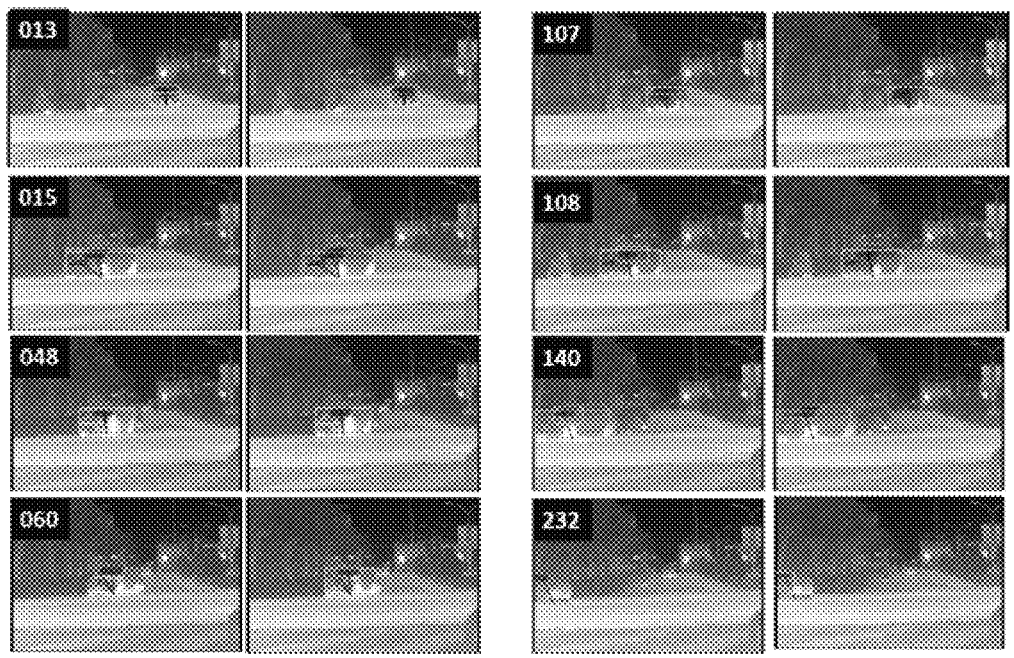
FIG. 15 are schematic views of results of vehicle detection which pairwise probability is further integrated into according to an embodiment of the present invention.

To solve the aforesaid problems effectively, the vehicle detection method of this embodiment uses a Markov random field model in describing a spatial dependency between vehicle components with reference to a singleton probability and a pairwise probability, so as to achieve effective detection. FIG. 14 are schematic views of results of vehicle detection which the singleton probability is introduced into according to an embodiment of the present invention, showing obviously that all combinations of vehicle windows (which are numbered 061, 066 and 326 in FIG. 14) wrongly identified as the background can be detected to thereby enhance vehicle detection accuracy. FIG. 15 are schematic views of results of vehicle detection which the pairwise probability is further integrated into according to an embodiment of the present invention, showing that vehicle windows, backgrounds and vehicle bodies wrongly identified as vehicles which are numbered 015, 048 and 140 in FIG. 14 can be effectively ruled out according to geometric dependency between vehicle components to thereby enhance accuracy in vehicle detection.

By following the above steps, it is feasible to detect a space geometric relationship of a vehicle window and a vehicle bottom and thus identify a vehicle likelihood region, thereby estimating the number of vehicles traveling on the road R.

Therefore, a vehicle detection method and a vehicle detection device for use with the vehicle detection method of the present invention enhance the stability and accuracy of thermal imaging vehicle detection by multiple different features and geometric relationships descriptive thereof The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A vehicle detection method based on thermal imaging, adapted to capture a total thermal image of a specific region, the vehicle detection method comprising:
   an initial vehicle likelihood region identifying step in which a signature cutting algorithm discerns initial vehicle likelihood regions and a background region in the total thermal image and deducts the background region by a background deduction technique to identify the initial vehicle likelihood region;
   a vehicle window locating step in which a border detection algorithm and a Hough transform detect an object component which has a feature that a pair of parallel horizontal lines are shown in a thermal image of the initial vehicle likelihood regions and a feature that a center of the thermal image is of low brightness, and the object component is regarded as a located vehicle window;
   a vehicle bottom locating step in which the border detection algorithm and the Hough transform detect an additional object component which has a feature that the thermal image of the initial vehicle likelihood regions is slender and a feature that the thermal image is of high brightness, and the additional object component is regarded as a located vehicle bottom; and
   a vehicle detecting step in which a space geometric relationship of the located vehicle window and vehicle bottom is described with a Markov random field, wherein, if the space geometric relationship conforms with a predetermined space geometric relationship, a region having the vehicle window and vehicle bottom with the space geometric relationship therebetween is regarded as an advanced vehicle likelihood region, thereby detecting a vehicle.

2. The vehicle detection method of claim 1, wherein the signature cutting algorithm comprises:
   a pixel point value defining step for defining numerical values of pixel points included in the total thermal image and attributed to a thermal image value larger than a least thermal image value of the vehicle likelihood region;
   a valid vertical area reserving step for calculating vertical projections of the numerical values of the pixel points of the total thermal image, cutting out invalid vertical areas with zero vertical projections, and reserving valid vertical areas with none-zero vertical projections;
   a valid horizontal area reserving step for calculating horizontal projections of the numerical values of the pixel points of the valid vertical areas, cutting out invalid horizontal areas with zero horizontal projections, and reserving valid horizontal areas with non-zero horizontal projections; and
   a vehicle likelihood region demarcating step for demarcating the valid horizontal areas as the vehicle likelihood regions.

3. The vehicle detection method of claim 2, wherein parameters of the vehicle window are defined as $(c_x, c_y, w, h)$, wherein $(c_x, c_y)$ denotes a center of the vehicle window, and $(w, h)$ denotes width and height of the vehicle window.

4. The vehicle detection method of claim 3, wherein an upper horizontal line and a lower horizontal line are defined by equations as follows:

$$M^{(u)}(x, y) = \begin{cases} 1 & \text{if } G_X(x, y) = 0, G_y(x, y) < -Th \\ 0 & \text{otherwise} \end{cases}$$

$$M^{(l)}(x, y) = \begin{cases} 1 & \text{if } G_X(x, y) = 0, G_y(x, y) >= Th \\ 0 & \text{otherwise} \end{cases}$$

wherein $M^{(u)}(x, y)$ denotes an upper horizontal line margin point mask, $M^{(l)}(x, y)$ denotes a lower horizontal line margin point mask, $G_x(x, y)$ denotes a gradient value of the vehicle window in x-direction, $G_y(x, y)$ denotes a gradient value of the vehicle window in y-direction, and Th denotes a configured margin mask threshold.

5. The vehicle detection method of claim 4, wherein $u=(u_x, u_y) \in M^{(u)}$ denotes a point of the upper horizontal line, and $l=(l_x, l_y) \in M^{(l)}$ denotes a point of the lower horizontal line, so as to vote for upper and lower horizontal points $S=\{(u, l) | u_x=l_x\}$ on a vertical line and parameter space vehicle window $(c_y, h)$, wherein $$c_y = \frac{u_y + l_y}{2}, h = |u_y - l_y|$$

wherein, after a parameter space voting result has been obtained, a parameter of region vote maximization is regarded as a possible candidate $H=\{c_y^{(i)}, h^i\}_{i=1}^{N_H}$ of the vehicle window, wherein $N_h$ denotes a number of possible candidates of the vehicle window;
wherein the upper and lower horizontal points $S^{(h)}=\{(u^{(h)}, l^{(h)})\}$ are inferred from all possible parameters $h \in H$ of the vehicle window, and then all the horizontal points are connected, wherein a starting point and an ending point are recorded, when the length of a line is larger than a predetermined threshold, such that a width and coordinates of a center of the vehicle window are defined as follows:

$$c_x = \frac{p_s + p_e}{2}, w = |p_s - p_e|$$

wherein $p_s$ denotes the starting point, and $p_e$ denotes the ending point.

6. The vehicle detection method of claim 5, wherein, before the Hough transform algorithm starts, a heat grayscale Gaussian model of the vehicle window is analyzed with a Gaussian model, and then a distance between the heat grayscale Gaussian model and a predetermined heat grayscale Gaussian model corresponding to the vehicle window is calculated, wherein, if the distance is larger than a predetermined threshold, the detection is regarded as wrong, so as to eliminate any wrongly identified vehicle window.

7. The vehicle detection method of claim 6, wherein the distance is expressed by an equation as follows:

$$d_b = (R_i, R_j) = \frac{1}{8}(\mu_i - \mu_j)^T \left|\frac{\sigma_i + \sigma_j}{2}\right|(\mu_i - \mu_j) + \frac{1}{2}\ln\frac{\left|\frac{\sigma_i + \sigma_j}{2}\right|}{\sqrt{|\sigma_i||\sigma_i|}}$$

wherein ($\mu_i$, $\sigma_i$) and ($\mu_j$, $\sigma_j$) denote means and standard deviations of the predetermined heat grayscale Gaussian model and the heat grayscale Gaussian model of the vehicle window thermal image region, respectively.

8. The vehicle detection method of claim 7, wherein the border detection algorithm is a Sobel operator border detection algorithm.

9. The vehicle detection method of claim 1, wherein the Markov random field allows a space geometric relationship of the vehicle window and the vehicle bottom to be defined as a label problem, wherein, a graphical model G=(V, E) is provided, wherein V={$v_1$, $v_2$, ..., $v_n$} denotes vertices and corresponds to all detected components of vehicles, wherein E={$e_1$, $e_2$, ..., $e_m$} denote edges, indicating adjacent components of vehicles, wherein, according to the graphical model, a vehicle detection problem is described as how to match each vertex with one of three possible labels, namely false vertex (0), vehicle window (1), and vehicle bottom (2), wherein probability maximization-oriented labeling F={$f_1$, $f_2$, ..., $f_n$}, and is defined as follows:

$$Pr(F) = \frac{1}{Z}\prod_{v_i \in V}\phi(f_i)\prod_{(i,j) \in E}\varphi(f_i, f_j)$$

wherein Z denotes a normalization coefficient, $\phi(f_i)$ denotes detected vertices, $v_i$, denotes a confidence index of one of the vehicle window and the vehicle bottom, and $\phi(f_i, f_j)$ denotes the relationship between two adjacent vertices, with a mixed Gaussian model which enables prior learning.

* * * * *